Figure 1:
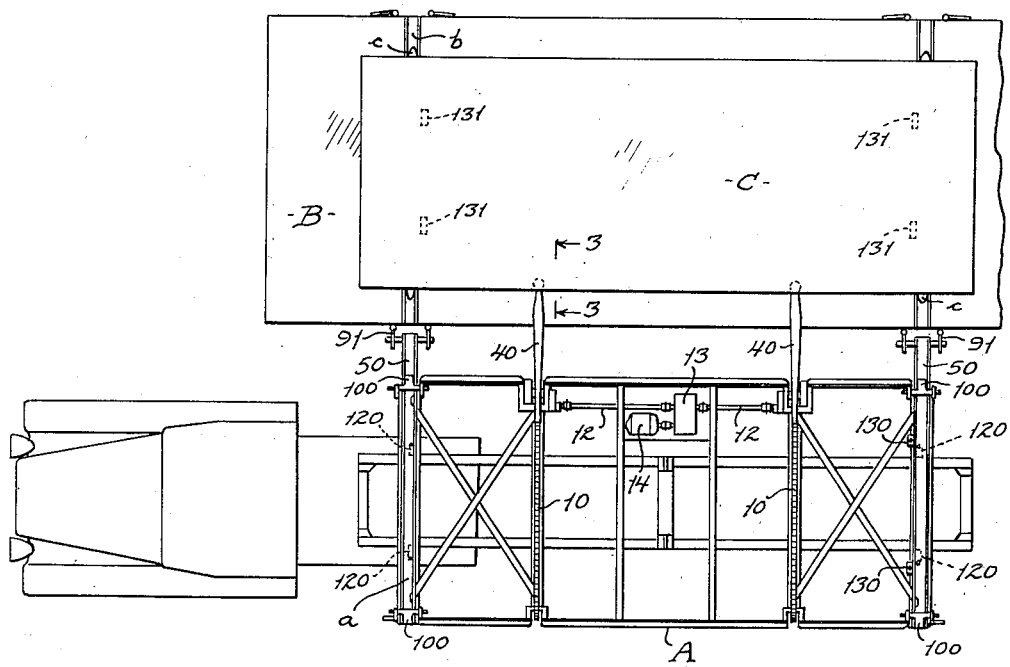

Dec. 23, 1941.  B. F. FITCH ET AL  2,266,749
FREIGHT TRANSFERRING MECHANISM
Filed Dec. 13, 1939  3 Sheets-Sheet 1

INVENTORS.
Benjamin F. Fitch and
Ragnar A. Norbom,
By Bates, Teare & McBean, ATTORNEYS.

Patented Dec. 23, 1941

2,266,749

UNITED STATES PATENT OFFICE 2,266,749

FREIGHT TRANSFERRING MECHANISM

Benjamin F. Fitch, Fairfield County, Conn., and Ragnar A. Norbom, Nutley, N. J., assignors to Motor Terminals, Inc., Cleveland, Ohio, a corporation of Ohio Application December 13, 1939, Serial No. 309,024

12 Claims. (Cl. 214—85)

This invention relates to a system of transferring freight by means of demountable bodies adapted to be moved with their loads from one vehicle to another or from a vehicle to a platform. More particularly, the invention is concerned with a highway truck having guideways for supporting a demountable body, the truck being equipped with movable bridges which are adapted to be attached at their distant ends to another vehicle or to a platform and when so attached to establish an effective guide and support between the guideway on the truck and a guideway on the other vehicle or platform.

It is an object of this invention to provide the movable bridges of such construction and supported in such a manner that they may be extended various distances from the truck, according to the space between the truck and the other vehicle or platform, and be attached by pivotal connections to both the truck and such other vehicle or platform. By this means, we have provided for a considerable variation in space between the vehicles, allowing for ready positioning of the truck, and have also provided for various elevations of the truck with reference to the other vehicle or platform. Thus, the variable depression of the truck on its springs, according to the load carried, becomes immaterial.

Another feature of our invention is concerned with an intermediate guideway on the truck, assisting in a ready passage of the container from the variably pivoted bridge to the guideway on the truck, or from such guideway as the case may be.

Our invention is illustrated in the drawings hereof and is hereinafter more fully described and its essential novel features are summarized in the claims.

Figure 2:
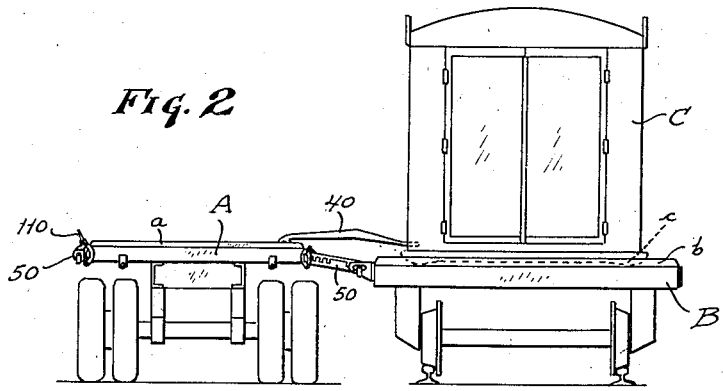
Figure 3:
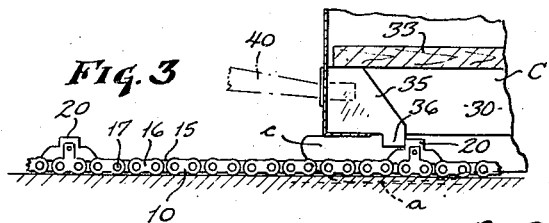
Figure 4:
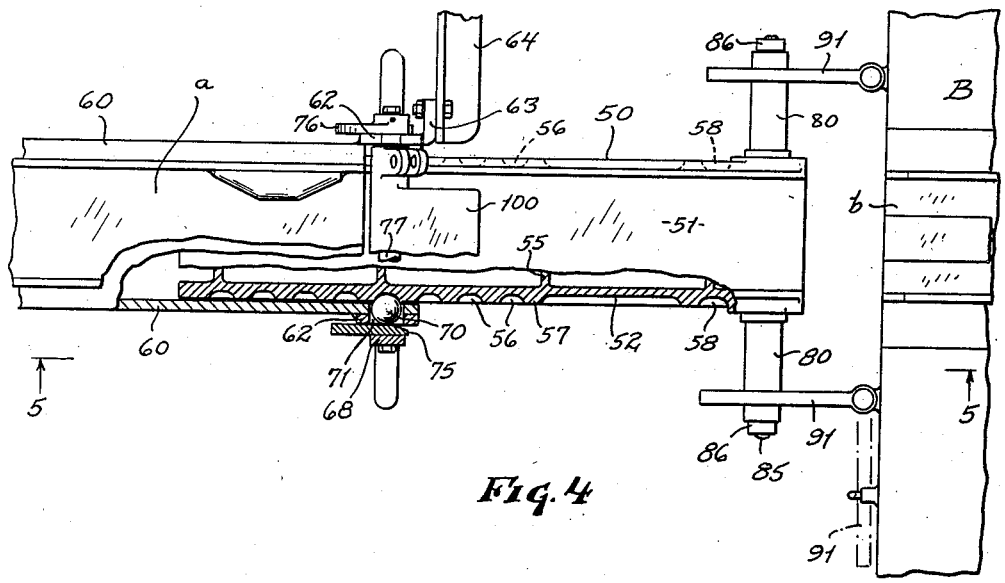
Figure 5:
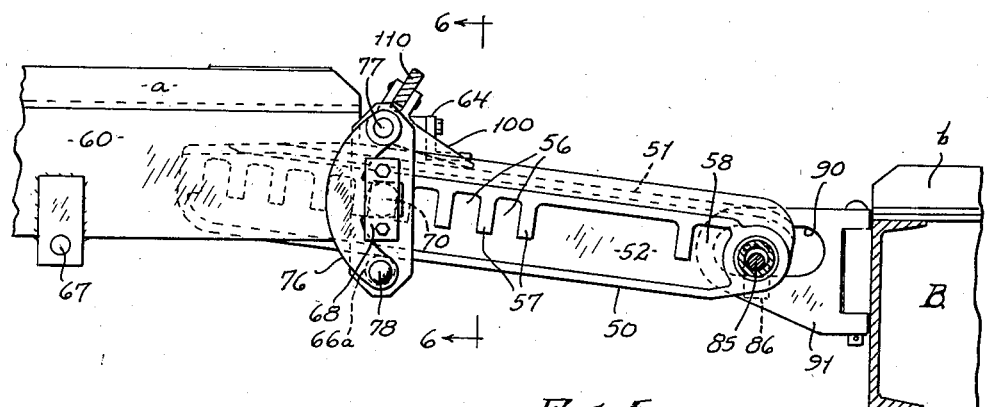
Figure 6:
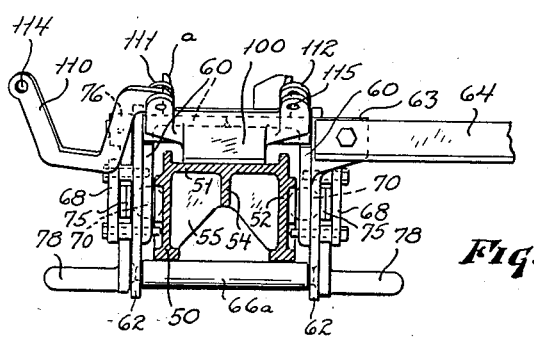
Figure 8:
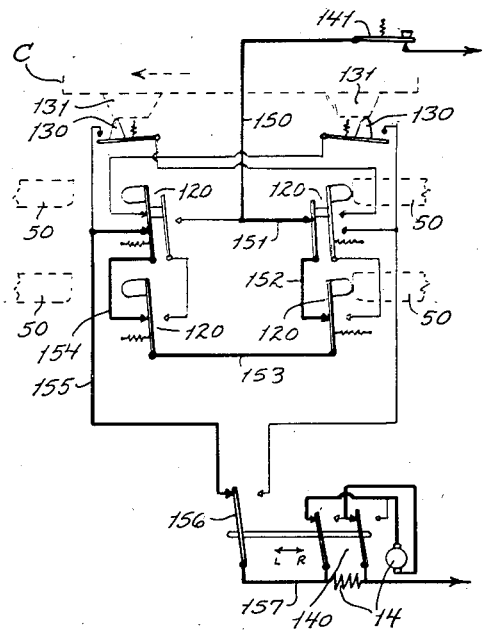
Figure 9:
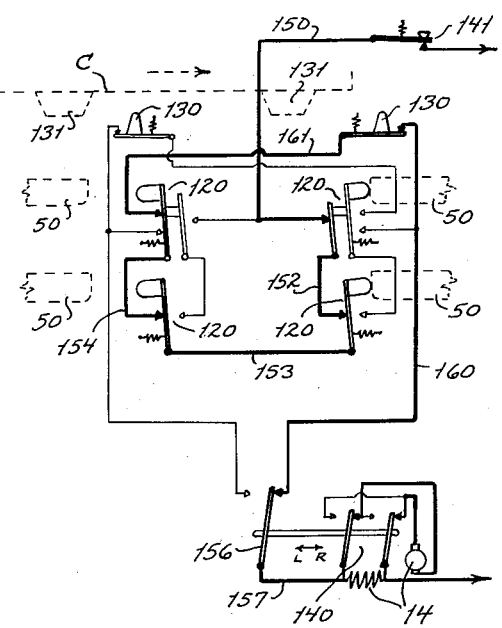
Figure 7:
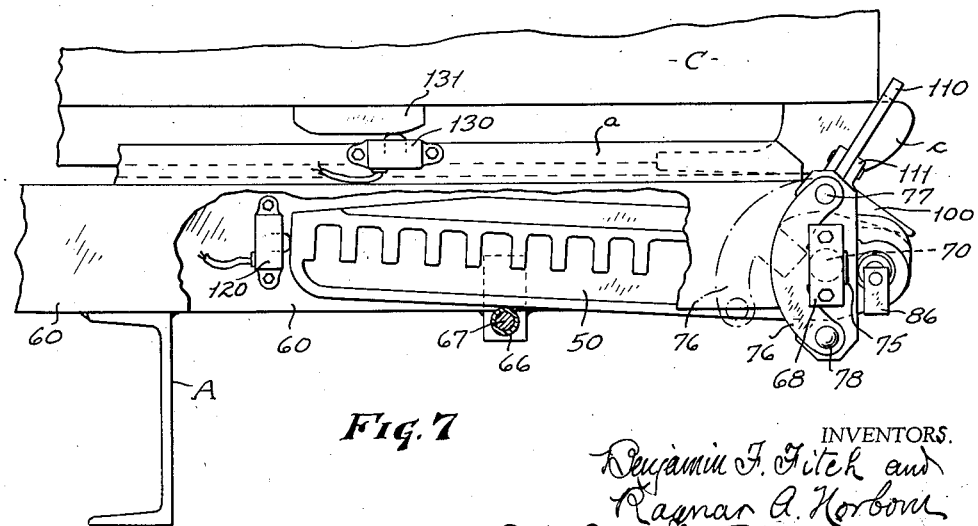

In the drawings, Fig. 1 is a plan of a highway vehicle, a railway car and a container mounted on the car and coupled with propelling mechanism on the truck ready for transference to the truck; Fig. 2 is an end elevation of the highway truck, railway car and container shown in Fig. 1; Fig. 3 is a fragmentary elevation of a propelling chain on a truck and a portion of the container engaged by the chain, the container portion of this view being substantially on the line 3—3 of Fig. 1, but illustrating the container after it reaches the highway truck; Fig. 4 is a sectional plan of one of the bridges and the adjacent portion of the highway truck carrying the bridge and the adjacent part of the railway car to which the bridge is attached; Fig. 5 is a side view of the parts shown in Fig. 4; Fig. 6 is a vertical section through one of the bridges as indicated by the line 6—6 on Fig. 5; Fig. 7 is an elevation, partly broken away, of a portion of the highway truck and the container thereon, illustrating the bridge retracted; Figs. 8 and 9 are diagrams illustrating circuits which may be employed with the limit switches shown in Fig. 7, Fig. 8 showing by heavy lines the circuits which are active when the container starts to move off of the truck, and Fig. 9 showing by heavy lines the circuits which are active when the container is being moved from the vehicle onto the truck. In these diagrams, the cooperating platform or railway car is supposed to be at the left of the figure.

In Figs. 1 and 2 of the drawings, A represents a highway truck, which may comprise a tractor and trailer; B, a railway car, and C, a demountable container adapted to stand either on the car or the truck. As illustrated, the container is of comparatively large size and adapted for mounting on the car or truck lengthwise thereof, and to be shifted laterally across the side of the truck to the car and vice versa.

As shown, the container C has skid rails c on its base which are adapted to occupy upwardly facing channels a on the truck or b on the car. To propel such container from the truck to the car or vice versa, we may, if desired, employ the mechanism illustrated in Fig. 1. While this mechanism, and various contributing features, are not per se, claimed in this application, it is convenient to describe them at this point.

Mounted transversely of the truck are a pair of endless propelling chains 10 looped around suitable sprocket wheels, not shown. One sprocket wheel for each chain may be coupled to a shaft 12 which is connected through reduction gearing in a housing 13 with the driving motor 14, so that the motor may move the two chains in unison. Each sprocket chain is composed of pairs of overlapping inner links 15 and outer links 16 connected by transverse pins 17, Fig. 3. These pins provide means for anchoring the push-and-pull bar hereafter described. Some of the outer links 16 have portions projecting away from the chain proper, and between such projections are secured blocks 20 adapted to coact with down-projections on the body to propell it.

The demountable body C has a floor frame including transverse beams 30, Fig. 3. The floor planking 33 rests on the tops of these cross beams, and skid rails c are at their bottoms. Adjacent the transverse beams, at each side of the container, we mount a box-like casting 35, which may be welded to the container side and to the cross beams. This casting has formed on its lower face a downward projecting boss 36 which is adapted to be engaged by any of the blocks 20 of the propelling chain. The interior of the casting may be hollow and formed to receive and anchor a push-and-pull bar 40. The other end of which is adapted to be attached to the chain, as set out in our application No. 301,920, filed October 30, 1939.

Now when the push-and-pull bars are attached to the demountable body in the manner shown in Fig. 1, and the chains operated in the direction to carry their upper reaches away from the body, the push-and-pull bars will pull the body toward the truck.

After the body has come onto the truck, the push-and-pull bars are disconnected from the chain and the body, and thereafter, the movement of the chains in the same direction as before causes the blocks 20 thereon, which are next beyond the bosses 36 to come into engagement with those bosses, so that the chains may thereafter directly engage the container and pull it to its final position on the truck.

Similarly, when the body is to be shifted from the truck to the car, the motor is operated in the reverse direction from that described and blocks 20 on the two chains come into engagement with the two downward lugs on the container so that it is shoved directly by the chains toward the car. Then, after the container has been moved a distance greater than the length of a push-and-pull bar from the far edge of the truck, the push-and-pull bars are attached, and then the chains, acting through these push-and-pull bars, continue to shove the container until it is in place on the railway car.

To avoid the necessity of levelling the truck in exact correspondence with the height of the car, and of bringing the truck to an exact distance from the side of the car to enable the transfer of the body from one vehicle to the other, we provide bridges which are adapted to be pivotally connected to the truck at selected points on the bridges, the far ends of these bridges being thereafter attached to the car side. Accordingly, when the bridges are positioned and attached to the car, they provide substantially continuous guideways and supports between the vehicles, notwithstanding variable height and variable separation of the vehicles, and notwithstanding the change in relative elevation as the load passes from one vehicle to another. The variable pivotal connection of the bridge with the truck, which enables this operation, is one of the important features of this invention, as will now be described with particular reference to Figs. 4 to 7, inclusive.

In the embodiment shown, there are four of the variable pivoted bridges mentioned, two on each side of the truck, each bridge (designated 50) being adjacent an end of one of the transverse guideways a. These guideways are preferably upwardly facing channels a provided with spaced inward projections to coact with skid rails on the bases of the containers. These channels are mounted on transverse beams which are in the form of downwardly facing channels 60 forming a housing for the bridges. These beams are conveniently made of two angle bars having horizontal upper flanges abutting and welded together, and vertical downward flanges spaced apart as shown, particularly in Fig. 6. We have thus provided open ended housings, beneath the guideways, in which the bridges are telescopically mounted.

Each bridge comprises a steel casting or forging having a guiding surface along its top face 51, and a succession of keepers along its opposite sides 52, to coact with plungers hereinafter described. The bridge is referably a hollow member, as indicated in Fig. 6, the top portion 51 being strengthened by a longitudinal web 54, and there being various cross shapes 55 to brace the sides and top. The sides preferably extend slightly above the top to make the guideway channel-shaped, as desired.

The keepers on the sides of the bridges are preferably recesses 56, formed between integral bosses 57 on the bridges, and the plungers which coact with the keepers may conveniently consist of balls 70 adapted to occupy any of such recesses and be held therein by means engaging the outer face of the balls, as hereinafter described.

The vertical flanges of the truck beams 60 project horizontally beyond the top flanges thereof, and such projecting portions are reinforced at their outer faces by vertical strips 62 which continue the housing for the bridge and carry the variable pivotal mechanism about to be described. Two of the reinforcing plates 62 carry ears 63, at their upper ends, to which may be attached bars 64 connecting the two housings on that side of the truck.

When the bridges are idle, as when a truck is travelling over the highway, the bridge is substantially entirely housed within the channel provided by the beams 60, as shown in Fig. 7, and when in this position rests on rollers 66 and 66a mounted on a rod 67, carried by a bracket depending from the beam 60 and a rod mounted in the reinforcing plates 62, respectively. As these same beams 60 carry on their tops the upwardly facing channel a, which makes the guideway for the body, the bridge is in the same vertical plane in the guide channel and when extended is in position to receive the skid rail on the body.

As heretofore mentioned, the pivoting of the bridge of the truck is preferably effected by a pair of balls 70, on opposite sides of the bridge, which occupy a selected pair of recesses 56. These balls are freely mounted in openings 71, formed in one of the channels 60, and in the reinforcing strip 62 thereon. The balls are held in engagement with the bridge by wedge shaped distance pieces 75, which lie between the balls and the frame plates 68 secured to the channels 60. When the wedges 75 are withdrawn, the balls may be entirely housed within the openings 71, leaving the bridge free to be moved in and out. When, however, the bridge has been positioned with one of its recesses 56 in registration with the opening 71, the forcing of the wedge 75 between the ball and keeper 68 forces the ball into the recess as shown in Fig. 4, thus forming a pivotal lock for the bridge. Thus, the bridge, though telescopically mounted on the truck may be pivoted to it at any one of a number of points along the bridge.

To manipulate the wedges 75 in a convenient manner, we form these wedges as extensions of levers 76, which are mounted on a rock shaft 77 journalled in the upper ends of the reinforcers 62 which project above the vertical flanges of angle bars 60. Each of the bars 76 is preferably provided with an outwardly extending handle 78. Accordingly, the manipulation of either handle may operate the rock shaft and swing the two wedges into or out of engagement, as desired.

It will be seen from Fig. 5 that there is an additional downwardly facing recess designated 58, near the free end of the bridge. This recess is for the purpose of enabling the bridge to be locked in its idle or telescoped position. When the bridge is in this position as shown in Fig. 7, this recess 58 is in registration with the ball, and accordingly when the levers 76 are brought into the position shown in full lines in Fig. 7, the balls are cammed into the recesses 58, and the bridge locked in idle position, suitable for traveling.

When the truck arrives at the destination for transfer, and it is desired to draw out the bridges to attach them to the side of the car or platform, it is only necessary for the operator to manually shove inwardly the locking levers 76 by pressure on their handle 78, swinging them into the position shown in broken lines in Fig. 7. Then the bridge may be drawn out manually to the desired position, after which its pivotal connection to the truck is effected by the return of the levers 76 and the consequent camming of the balls into registration with the selected recesses 56.

Any suitable means may be employed for attaching the free end of the bridge to the car side. As shown in the drawings, the bridge is provided adjacent its free end with a tubular bar 80, which is adapted to be received in slots 90 formed in wings 91 pivoted to the car side (normally parallel therewith as indicated in broken lines in Fig. 4) adapted to be swung out onto the position shown in full lines in Fig. 4 and Fig. 5, over the ends of the extensions 89. The tubular member contains a rod 85, having short arms 86 at its ends, and when these arms are turned into registration with the slots 90, the wings may be passed over the tubular rod and then when the arms extend downwardly to the wings, the parts are retained in engagement. This construction is not claimed herein, but in Patent No. 2,126,763, of our assignee, Motor Terminals, Inc.

When the bridges are attached, as above described, and supported by the car wings 91 and the truck rollers 66a, they connect the truck with the car, thus providing substantially continuous guideways between the channels a of the truck, and the channels b of the car. However, as the bridge is some distance lower than the channel a of the truck, we provide a pivotally mounted flap to make an easy connection between the bridge and the channel a. This flap is shown at 100, in Figs. 4, 5 and 6, pivotally mounted on the shaft 77, and resting by gravity on the bridge. The bridge may be readily operated in and out without reference to the flap, the flap adapting itself to whatever position the bridge takes on its pivot, and forming a ready guideway between the bridge and the channel a.

It will be understood that when the body shown in Figs. 1 and 2 is drawn from the car toward the truck by the pull bars 40, the shoes of the skid rail c as they pass from the channel b engage the tops of the bridges and slide along the same as the body travels; then, when these shoes reach the flaps 100, they pass upwardly along the tops of these flaps, and thence pass onto the channels a of the truck. Likewise, in moving a body from the truck to the car, the flaps are active as the skid rail shoe passes from the channel a to the bridge and thence to the car.

When the body is on the truck it is desirable to lock it against inadvertent shifting lengthwise of the channels a. To effect such locking, we may provide a stirrup 110, pivoted to ears 111, rising from the pivoted flap 100 adjacent one edge thereof, as shown in Fig. 6. When the body is on the truck, this stirrup is swung over the projecting end of the skid rail c (that is, over the shoe of the skid rail), as indicated in Fig. 7. This brings the free end of the stirrup between ears 112 on the other side of the flap member. In this position an opening 114 in the stirrup is in registration with openings 115 in the ears, so that the hasp of the padlock or a car seal may be readily passed through these registered openings to lock the stirrup in place.

To prevent inadvertent operation of the motor 14 before bridges are withdrawn for attachment, as well as prevent the operation of the motor in the wrong direction after the bridges are attached, we provide a system of automatic switches and circuits controlled by the container and the bridges. This system will now be described with reference to Figs. 7, 8 and 9.

As appears in Fig. 7, the truck is provided with a push-button switch 120, one for each bridge, adapted to be abutted and actuated when the bridge is in its innermost or idle position. The truck has also two switches 130 for each channel a, and each of these switches coact with and are operated by projections 131 on the bottom of the container. One switch 130 and one projection 131 are shown in Fig. 7, and the same construction is duplicated adjacent the other side of the container, as illustrated in the diagrams, Figs. 8 and 9.

In the diagrams, the motor 14 is shown by its field and armature. Its direction is controlled by a double pole switch 140, to change the relation of the field circuit to the armature circuit. The turning on or off of the motor is controlled by a switch 141.

In Fig. 8, the parts are positioned for starting the container C resting on the truck in a movement toward the left to coact with the bridges 50 and thence to a car at the left (not shown). These bridges are accordingly drawn out from their idle position and attached to the car while the bridges 50 at the right of the diagram are in their innermost position, thus coacting with the switches 120. This coaction of the right hand bridges 50 with their switches renders active the circuit from the switch 141 to the motor.

Tracing the circuit in Fig. 8, it leads from the switch 141 via the lines 150 and 151 to the switch 120 of one of the bridges on that side of the truck; thence via the line 152 to the switch 120 of the other bridge on that side; thence via the line 153 to a switch 120 on the side where the bridges have been withdrawn. This switch is now in the opposite position from the switch on the right hand side, and hence the circuit continues via the line 154 to the other switch 120 on the active side; and thence to the line 155 to a switch 156 mechanically controlled by the reversing switch 140. This switch 156 being thus active continues the circuit via the line 157 to the motor.

Accordingly, with the circuits as in Fig. 8, the motor is in position to be energized, whenever the switch 141 is closed, in a direction to shift the body from the truck toward the bridges which have been withdrawn and attached to the car. If at this time the reversing switch were in the wrong direction, the described circuit would be open between the line 155 and the switch 156. Nor could a circuit be made to the switch 156 via the right hand conductors in the diagram (Fig. 8) because such circuit is necessarily open by reason of the limit switches 130 held in inactive position by the projections 131 on the container. The only circuit possible, therefore, is to operate the motor in the desired direction.

Moreover, unless both bridges on the active side of the truck are drawn out, it is impossible to move the container in that direction, for, with either of these bridges in its inner position, the corresponding switch 120 would be open and there would be no connection from the line 153 to the line 155. Also, if either or both of the bridges on the non-active side is inadvertantly drawn out, this would prevent the operation, for the circuits would be open on that side between the line 151 and the line 153. Accordingly, to obtain any movement of the motor to operate a container on the truck, it is necessary that both bridges on the non-active side be in their innermost position, and both bridges on their active side be drawn out, and the only movement allowed to the motor under these circumstances is in a direction toward the active side.

Fig. 9 indicates the position of the circuits when the container is being drawn from a car at the left of the diagram, onto a truck carrying the limit switches 130 for the container, and 120 for the bridges, and having the circuits already described. Under these circumstances, the reversing motor switch 140 is in the opposite position from that of Fig. 8, and the switch 156 is thereby connected by the conductor 160 to the limit switch 130; thence via the line 161 to the first switch 120 on the active side; thence via the line 154 to the other active switch 120, to the line 153, to the first idle switch 120, to the line 152, to the second idle switch 120, to the line 151 and the line 150 to the controlling switch 141.

Accordingly, with the circuits as just described, the motor is coupled in the proper direction to draw the container from the car onto the truck, and this operation is only possible when the left hand bridges are drawn out for attachment to the car, and when the right hand bridges are pushed into their idle position. Furthermore, the movement of the container onto the truck necessarily stops as soon as the leading projection 131 engages the right hand limit switch 130, and opens it as the container comes into final position on the truck. In such travel, both projections struck the first limit switch, but that was immaterial as the circuit from this switch was not employed at the time, as indicated by the light circuit lines in the diagram.

It will be seen from the diagrams that the circuits are arranged symmetrically with reference to the right and left hand sides of the truck, so that while we have described the operation with reference to a car on the left hand side of the diagrams, the operation will be similar with reference to the car on the right hand side, in which case the idle circuits indicated by light lines would be active, and the active circuits indicated by heavy lines would be idle.

It will be seen from the above description that the protecting circuits and switches prevent the movement of the body from or onto the truck unless all of the bridges are properly placed; that they prevent running the body off the wrong side of the truck and they insure proper positioning of the body when it has been brought on the truck.

We claim:

1. The combination of a vehicle adapted to carry a container and having propelling means to push or pull the same off of the vehicle or onto it, a bridge carried by the vehicle and adapted to telescope into it and adapted to project various amounts beyond the edge of the vehicle and to be attached at its far end to a suitable platform, and means for establishing a non-shiftable pivotal connection between the vehicle and the bridge at any selected one of a number of points on the bridge.

2. The combination of a vehicle having guideways, for carrying a container and arranged with open housings beneath the guideways, bridges adapted to telescope into the housings, and means for establishing pivotal connections between the vehicle and bridges at various points along the length of the bridges, said connections also locking the bridges against telescoping into or out of the housings.

3. The combination of a vehicle, a bridge provided with a series of keepers and a retaining device on the vehicle adapted to coact pivotally with any one of the keepers, whereby the bridge may be variably pivoted to the vehicle.

4. The combination of a highway truck, a bridge telescopically mounted thereon and adapted to project beyond the edge of the truck, the highway truck having retaining means adapted to coact with a keeper on the bridge to hold the bridge in its idle position on the truck, said bridge having a series of keepers any one of which may coact pivotally with the retaining means when the bridge is drawn out from the truck.

5. The combination of a vehicle, a bridge so carried by the vehicle that the bridge may be moved out beyond the edge of the vehicle, said bridge having a row of recesses in its side, a plunger carried by the vehicle adapted to extend into any of the recesses and form a pivot for the bridge, and means for holding said plunger in a selected recess.

6. The combination of a truck having a guideway for a container and a housing for a bridge, a bridge telescopically mounted in the housing, and having a row of recesses along each side, a pair of plungers on opposite sides of the bridge carried by the truck and adapted to enter any of the recesses and form a pivot for the bridge, means on the truck for operating the plungers to hold them in their active position.

7. The combination with a vehicle having a space for the reception of a bridge, of a bridge which may occupy said space or be moved out beyond the edge of the vehicle, said bridge having a row of recesses in its side, a ball carried by the vehicle adapted to extend into any of the recesses, and means engaging the opposite face of the ball for holding it in a selected recess.

8. In a vehicle, the combination of a guideway for a container, there being a space beneath the guideway, a bridge adapted to telescope into such space, said bridge having a row of recesses on each side, a pair of balls carried by the vehicle on opposite sides of the bridge adapted to extend into any recess or clear all of them, and distance pieces adapted to be forced between the outer sides of the balls and abutments on the vehicle to hold the balls in selected recesses on opposite sides of the bridge.

9. In the combination of a truck having a housing for a bridge, a bridge telescopically mounted in the housing and having a row of recesses along its side, a plunger carried by the truck and adapted to enter any of the recesses, and a lever mounted on the truck and having a projection adapted to pass between the outer face of the plunger and abutments on the truck and thereby retain the plunger in engaging position.

10. In the combination of a highway truck, a transverse downwardly facing channel beam therein, a guideway carried by and projecting upwardly from the channel beam for guiding and positioning a container on the truck, a bridge telescopically mounted in the channel and adapted to extend various distances beyond the edge of the truck, means for attaching the far end of the bridge to another vehicle or platform, means to pivotally and variably anchor the bridge to the truck comprising a row of shoulders on opposite sides of the bridge, and operable devices on the truck adapted to coact with selected ones of said shoulders.

11. The combination of a highway truck having a guideway for a container, and having a housing beneath the guideway, a bridge adapted to be mounted telescopically in the housing or drawn partially out of the same variable distances, means for establishing a fixed pivotal connection between such variably positioned bridge and the truck, and a flap carried by the housing above the bridge and adapted to engage the top of the bridge and form a guide between it and the guideway on the truck.

12. The combination of a highway truck having a guideway for a container, a bridge telescopically mounted on the truck and adapted to be withdrawn variable distances therefrom, said bridge having a row of keepers along each side, means on the highway truck adapted to engage any of the keepers to pivotally connect the bridge at various regions thereof to the truck, and a flap pivotally carried by the truck adapted to engage the top of the bridge in its various active positions, the upper end of such flap terminating approximately in registration with the end of the guideway on the truck.

BENJAMIN F. FITCH.
RAGNAR A. NORBOM.